US011027663B2

(12) United States Patent
Himle

(10) Patent No.: US 11,027,663 B2
(45) Date of Patent: Jun. 8, 2021

(54) VEHICLE-MOUNTED BIKE RACK

(71) Applicant: Sean Himle, Herriman, UT (US)

(72) Inventor: Sean Himle, Herriman, UT (US)

( * ) Notice: Subject to any disclaimer, the term of this patent is extended or adjusted under 35 U.S.C. 154(b) by 0 days.

(21) Appl. No.: 16/450,819

(22) Filed: Jun. 24, 2019

(65) Prior Publication Data

US 2020/0047682 A1  Feb. 13, 2020

Related U.S. Application Data

(60) Provisional application No. 62/688,767, filed on Jun. 22, 2018.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ..................................... B60R 9/10; B60R 9/06
See application file for complete search history.

(56) References Cited

U.S. PATENT DOCUMENTS

| 5,092,504 | A  | * | 3/1992  | Hannes | B60R 9/00 |
|           |    |   |         |        | 211/17    |
| 6,732,893 | B2 | * | 5/2004  | Morris | B60R 9/048 |
|           |    |   |         |        | 224/502   |
| 6,746,066 | B2 | * | 6/2004  | Reed   | B62D 33/0273 |
|           |    |   |         |        | 296/26.08 |
| 8,025,196 | B2 | * | 9/2011  | Flaherty | B60R 9/06 |
|           |    |   |         |        | 224/533   |
| 9,522,635 | B2 | * | 12/2016 | Nusbaum | B60R 9/10 |
| 2012/0118928 | A1 | * | 5/2012 | Laws | B60R 9/06 |
|           |    |   |         |        | 224/403   |
| 2017/0369000 | A1 | * | 12/2017 | Pedrini | B60R 9/06 |
| 2018/0147996 | A1 | * | 5/2018 | Caglarcan | B60R 9/10 |
| 2019/0337464 | A1 | * | 11/2019 | Cox | B60R 9/10 |

FOREIGN PATENT DOCUMENTS

KR          1527412 B1 *  6/2015

* cited by examiner

*Primary Examiner* — Scott T McNurlen
(74) *Attorney, Agent, or Firm* — Morriss O'Bryant Compagni Cannon, PLLC

(57) ABSTRACT

A vehicle-mounted bike rack may include a first rack arm having a post extending from a first end and an opening formed in a second end of the first rack arm. The bike rack may also include a second rack arm having a slot formed in a first end and on opening formed in a second end of the second rack arm, and a cross bar extending substantially perpendicularly with the first and the second rack arms, and wherein the cross bar is received in the openings of the first and second rack arms, such that each of the first rack arm and second rack arm are pivotable about the cross bar. The first and second rack arms may be configured to engage with and secure to at least one of a tail gate post and a tail gate latch of a vehicle.

17 Claims, 7 Drawing Sheets

VEHICLE-MOUNTED BIKE RACK

CROSS-REFERENCE TO RELATED APPLICATIONS

This application claims the benefit of U.S. Provisional Patent Application Ser. No. 62/688,767, filed Jun. 22, 2018, entitled "VEHICLE-MOUNTED BIKE RACK," which is hereby incorporated by reference herein in its entirety, including but not limited to those portions that specifically appear hereinafter, the incorporation by reference being made with the following exception: In the event that any portion of the above-referenced application is inconsistent with this application, this application supersedes said above-referenced application.

STATEMENT REGARDING FEDERALLY SPONSORED RESEARCH OR DEVELOPMENT

Not Applicable.

BACKGROUND

1. The Field of the Invention

The present invention relates generally to bike racks.

More particularly, it concerns bike racks that can be mounted to a vehicle to transport bikes while minimizing potential damage to the vehicle during transport.

2. Description of Related Art

It is common practice in the field of vehicle-mounted bike racks to have trailer hitch mounted bike racks which come in a variety of configurations and can carry a single bike or a plurality of bikes. There are also roof racks which can stow and secure bikes to the roof of a vehicle.

There is also a trend of hanging bikes over the tailgate of a truck, such that the front tire overhangs the tailgate, thus securing, relatively speaking, the bike within the truck. Often bike pads can also be used to limit the damage that can be done to the tailgate or bike frame due to rubbing between the two during transport. However, in recent years, the dimensions and contours of tailgates has changes and increased, such that traditions bike frames can no longer hang over these types of tailgates, necessitating a new, convenient bike rack compatible with trucks or similar vehicles.

Despite the advantages of known bike rack systems, improvements are still being sought. The prior art is characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the present disclosure as it existed before the priority date of each claim of this application.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
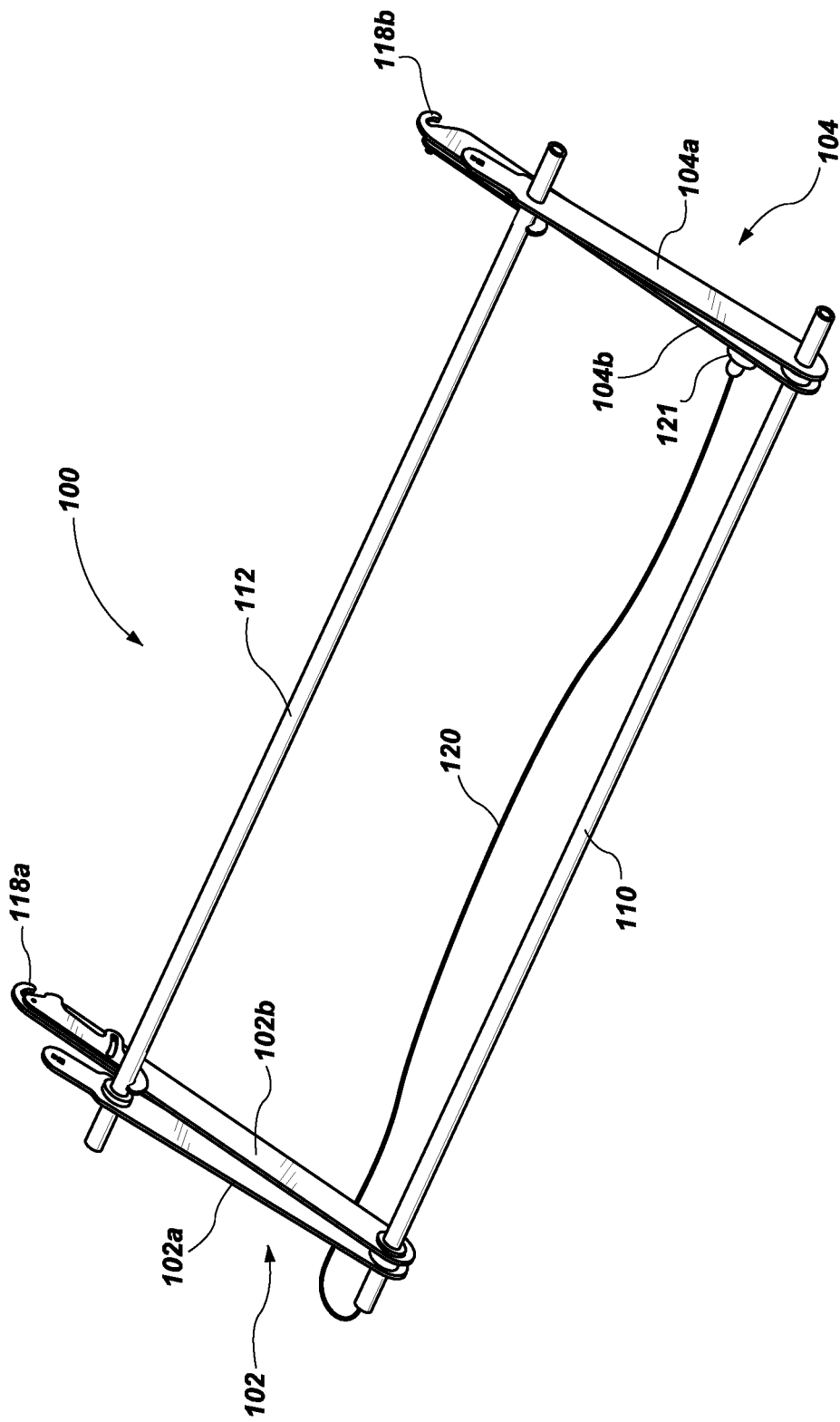
FIG. 1 is an isometric view of an embodiment of the disclosed invention.
Figure 2:
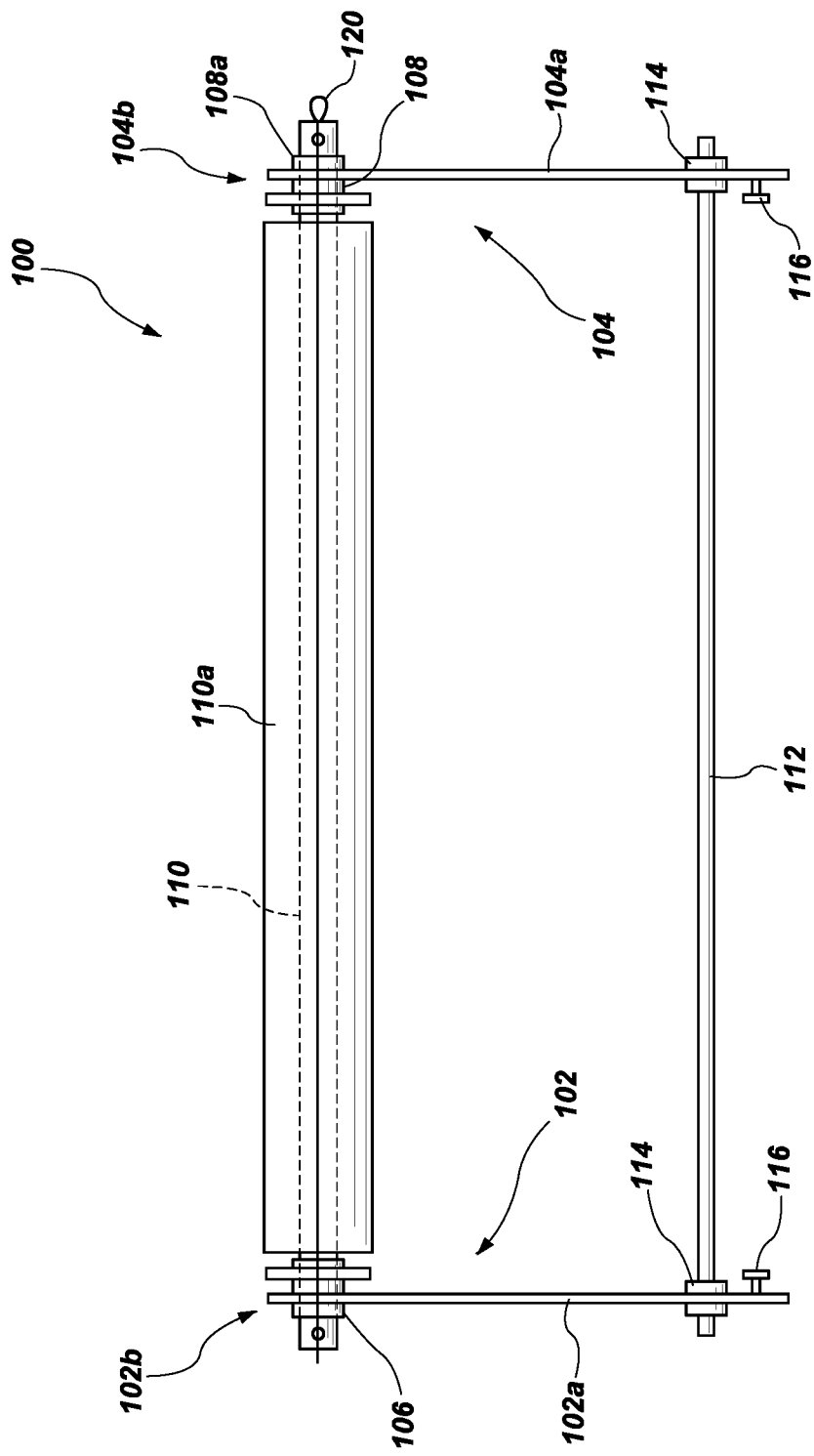
FIG. 2 is a front view of the embodiment of FIG. 1.
Figure 3:
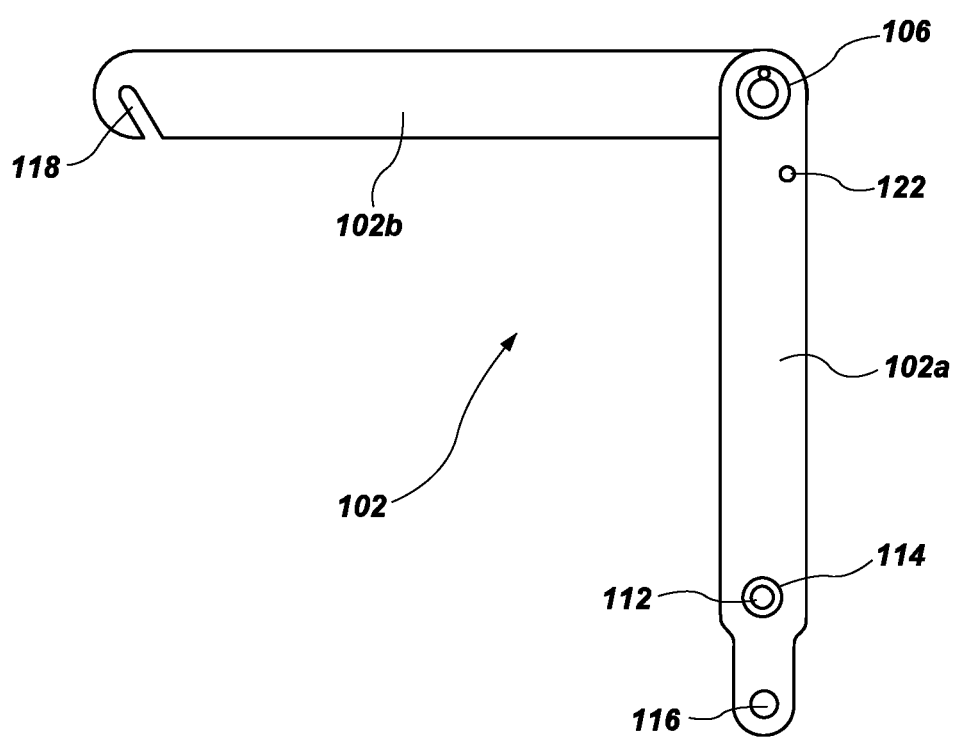
FIG. 3 is a side view of the embodiment of FIG. 1.
Figure 4:
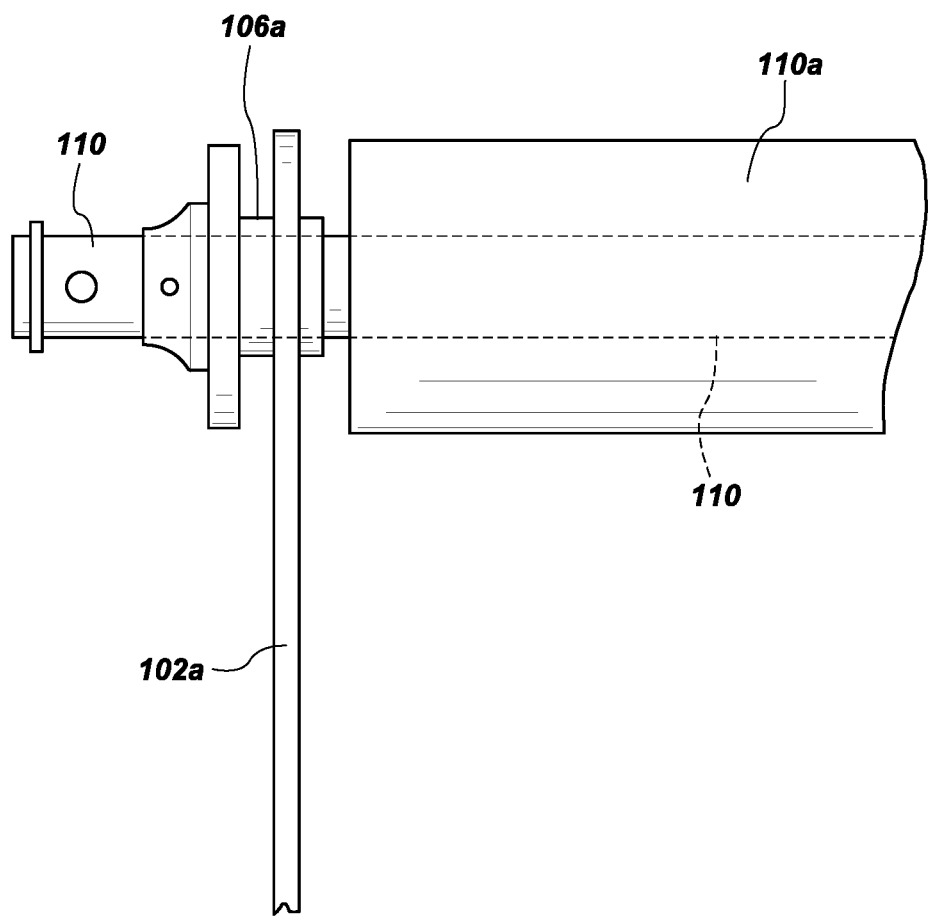
FIG. 4 is a zoomed-in front view of the embodiment of FIG. 1.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present apparatus and methods for providing a vehicle-mounted bike rack disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supersedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

The following inventive embodiments are related to a vehicle-mounted bike rack.

Referring now to FIGS. 1-4, there is shown an embodiment of the invention, in the form of a vehicle-mounted bike rack assembly 100 including, a first pair of rack arms 102 (arm 102a and arm 102b) and a second pair of rack arms 104 (arm 104a and arm 104b), wherein first rack arms 102a and 104a may be identical or substantially identical in construction and second rack arms 102b and 104b may be identical or substantially identical in construction. Each pair of rack arms 102 and 104 are pivotally connected to one another via a pivot joint 106 and 108, respectively, which may include respective openings in respective ends of the first rack arms 102a and 104a and second rack arms 102b and 104b. Each pivot joint 106 and 108 may also include a bearing or collar 106a and 108a, such as a set screw collar, for example, however, alternative pivot joints or engagements conventional in the art, may also be used.

The bike rack assembly 100 may also include a first crossbar 110 which can extend substantially horizontally, and substantially perpendicularly, between the first rack arms 102a and 104a and the second rack arms 102b and 104b. The first crossbar 110 can be received by the collars 106a and 108a, or openings, allowing the crossbar to slide into connection with the pivot joints 106 and 108 and enable the crossbar 110 to freely rotate with respect to the pair of rack arms 102 and 104. The crossbar 110 can also be configured to receive and include a crossbar pad 110a around an exterior surface of the crossbar 110. The cross bar pad 110a, or a foam pad for example, can provide a cushioned mounting surface for a bike frame, preventing unwanted scratches or damage to the bike frame.

The cross bar 110 may include first and second terminal ends, each of the terminal ends of the crossbar 110 extend through the corresponding collars 106a and 108a, such that the terminal ends are exposed beyond each of the pairs of rack arms 102 and 104. A cap 111 can be releasably attached to each of the terminal ends of the crossbar 110, holding the crossbar 110 in place, relative to the pair of rack arms 102 and 104, and against translation. Additionally, set screws, or other desired fasteners, may be received by the respective collars 106a and 108a and engage with the cross bar 110 to prevent translation with respect to the rack arms 102 and 104.

The crossbar 110 can have a 1" diameter, or another desired diameter, and can have a length to span 67" plus or minus 3", or more or less, which may be typical or conventional span of a truck or vehicle tailgate, although the crossbar 110 can also be configured to have alternative lengths, if desired.

The bike rack assembly 100 also includes a second cross bar 112, or stabilizer bar, which can extend substantially horizontally, and substantially perpendicularly, between first rack arms 102a and 104a. The stabilizer bar 112 can be received by collars 114 formed in corresponding openings in the first rack arms 102a and 104a, or bearings or set screw collars, for example, allowing the stabilizer bar 112 to slide into connection with the collars 114 and enable the crossbar to freely rotate with respect to the rack arms 102a and 104a, thus providing a stabilizing support for each of the pair of rack arms 102 and 104. The stabilizer bar 112 can be 1" or ½" in diameter, or another desired diameter.

Figure 6:
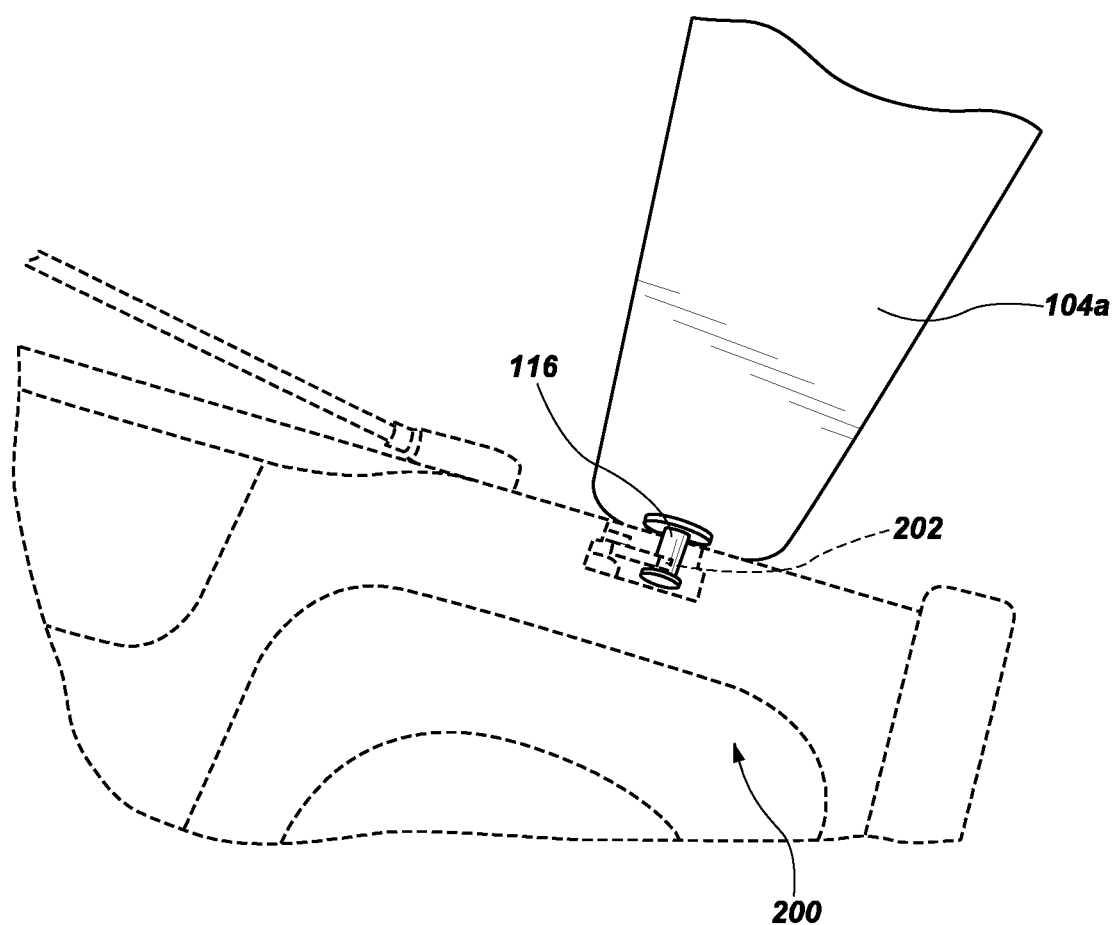
FIG. 6 is a top view of the embodiment of the disclosed invention, engaged with a latch of a vehicle tailgate.

Each of the rack arms 102a and 104a may also include a post 116, or striker, which extends from an end of the corresponding rack arm 102a and 104a, such that the post 116 can be received and locked into place within a standard or conventional tailgate latch 202, typically located in a tailgate 200, as shown in FIG. 6. By engaging the posts 116 with the latch 202 of the tailgate 200, the bike rack assembly 100 can be held in position and secure bikes during transport. Additionally, many vehicles include a tailgate lock, which could also be used to lock and secure the bike rack assembly into place.

Figure 7:
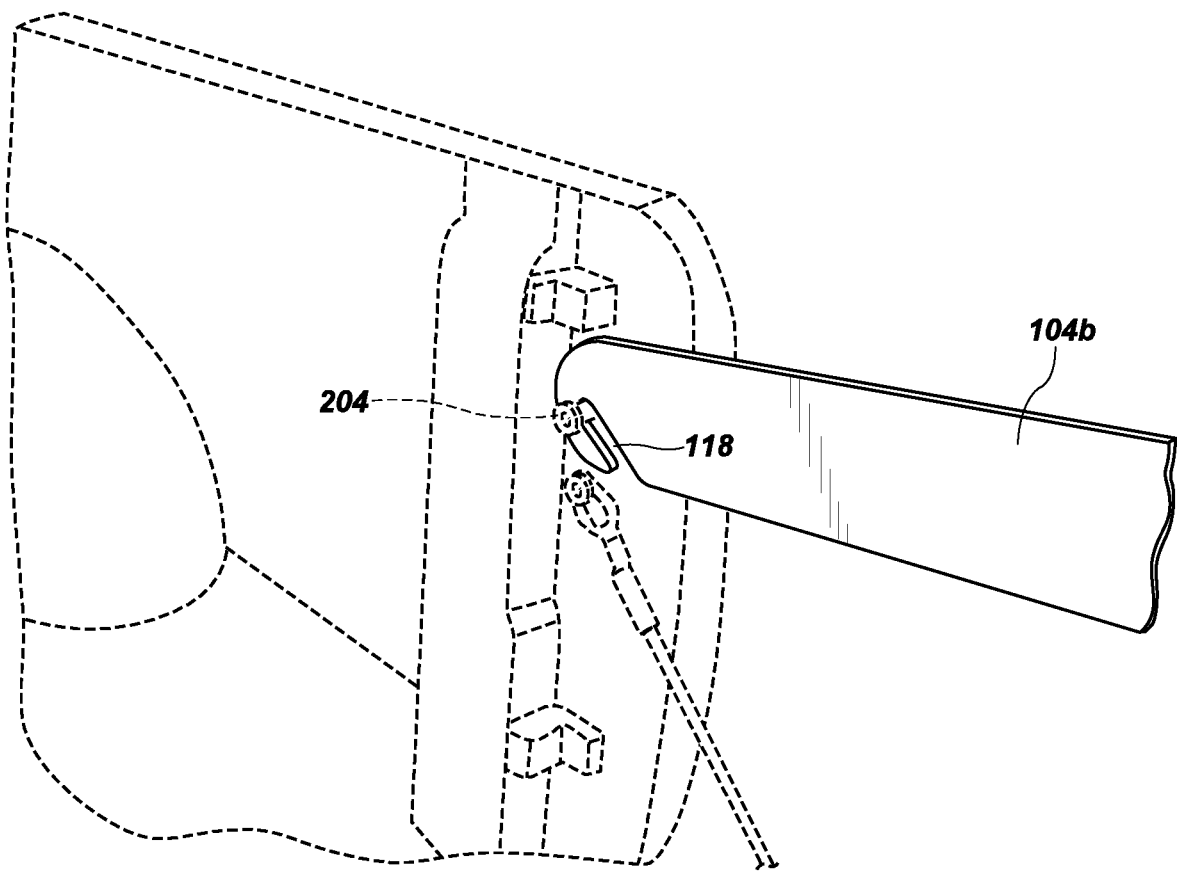
FIG. 7 is a side view of the embodiment of the disclosed invention, engaged with a post of a vehicle tailgate.

Each of the rack arms 102b and 104b also includes a slot 118, or channel, which extends at an angle on an end portion of the corresponding second rack arms 102b and 104b. The slots 118 are formed and configured to receive a conventional tailgate lock post 204, as shown in FIG. 7 such that rack arms 102b and 104b can pivot around such lock posts 204, but are translationally fixed into position relative tailgate. By engaging the slots 118 with the lock posts 204 of the tailgate, the bike rack assembly 100 can be held in position and secure bikes during transport.

Each rack arm 102a, 102b, 104a and 104b, can be 3" wide and have a length of 24", although alternative widths and lengths can be used if desired to accommodate different tail gate dimensions and different sized bikes.

The crossbar 110 can be hollow and can include a lock cable 120 which can be secured within the crossbar 110 in a first or retracted position, or on an end of the crossbar 110 and then extend out of one end of the crossbar 110 in an extended or second position. After a bike, or bikes, is placed on the crossbar 110 for transport, the cable 120 can be looped through the bike frame and secured back on one of the first rack arms 102a, by inserting a terminal end of the lock cable 120 into a locking mechanism 121, which may secure the lock cable through use of a key. Alternatively, the locking mechanism 121 may be a conventional locking mechanism such as a pad lock, which can be secured to the rack arm 102a via hole in the corresponding rack arm 102a.

Figure 5:
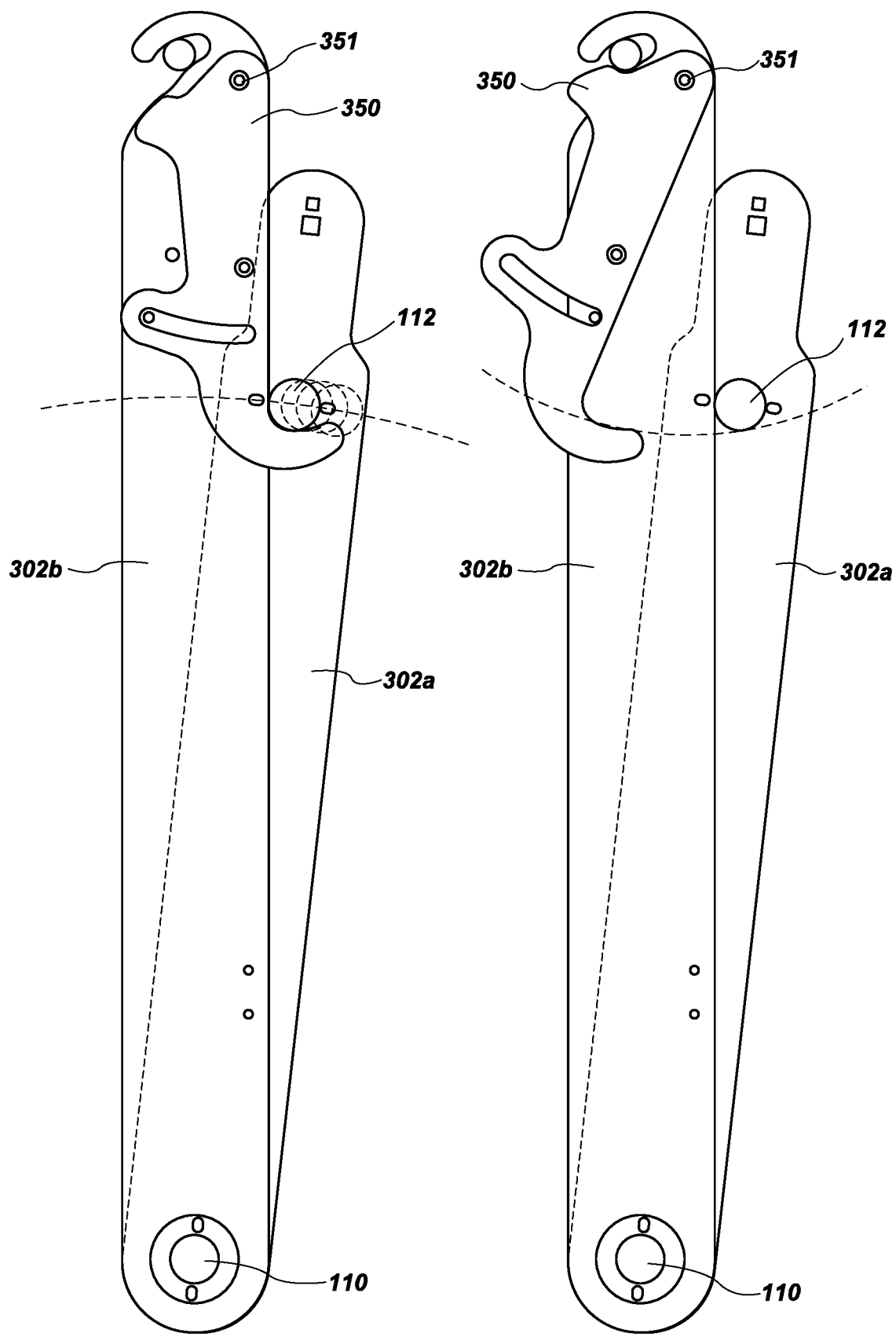
FIG. 5 includes an engaged side view and a disengaged view of rack arms of an embodiment of the disclosed invention.

In another embodiment, as shown in FIG. 5, a second rack arm 302b may include a rack latch 350. The rack latch 350 may be pivotally secured to the rack arm 302b, such that the latch 350 may be moved from an engaged, or locked, position to a disengaged, or unlocked position. In the engaged position, the latch 350 partially surrounds the cross bar 112 such that the corresponding rack arms 302a and 302b are locked in a position together, in a substantially collapsed position, for storage or the like. The latch 350 may then be moved into a disengaged position, where it pivots about a pin 351 to disengage from cross bar 112 and enable the rack arms 302a and 302b to pivot independently from one another, especially during use of the rack 100. Rack arms 302a and 302b may also be interchangeable with corresponding rack arms 102a, 102b 104a and 104b in the earlier disclosed embodiment.

Each of the rack arms 102 and 104, the crossbar 110 and the stabilizer bar 112, may be made of metal, plastic or other desired material which can make it light weight and durable. Additionally, due to the pivots 106 and 108 the bike rack assembly 100 can be fully collapsed when not in use.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A vehicle-mounted bike rack, comprising:
a first rack arm having a post extending from a first end and an opening formed in a second end of the first rack arm;
a second rack arm having a slot formed in a first end and an opening formed in a second end of the second rack arm;
a cross bar extending substantially perpendicularly with the first and the second rack arms, and wherein the cross bar is received in the openings of the first and second rack arms, such that each of the first rack arm and second rack arm are pivotable about the cross bar;
wherein the first and second rack arms are configured to engage with and secure to at least one of a tail gate post and a tail gate latch of a vehicle;
wherein each of the first rack arm and the second rack arm includes a second opening formed in the first end; and
a second cross bar extending substantially perpendicularly from the first rack arm, wherein the second cross bar is received in the second opening of the first rack arm.

2. The bike rack of claim 1, further comprising:
a lock cable fixed to the first cross bar.

3. The bike rack of claim 2, wherein the first cross bar is substantially hollow, forming an interior cavity, and wherein the lock cable is received in the interior cavity in a first position.

4. The bike rack of claim 3, further comprising:
a locking mechanism fixed to the second rack arm, wherein the locking mechanism is configured to receive a terminal end of the lock cable and secure the lock cable in a locked position.

5. The bike rack of claim 1, further comprising:
a cross bar pad received over an outer surface of the cross bar.

6. A vehicle-mounted bike rack, comprising:
a pair of first rack arms, each having a post extending from a first end, a first opening formed in a second end of each of the pair of first rack arms, and a second opening formed in the first end of each of the pair of first rack arms;
a pair of second rack arms, each having a slot formed in a first end and an opening formed in a second end of each of the second rack arms;
a first cross bar extending substantially perpendicularly between each of the pair of first and second rack arms, and wherein the cross bar is received in the first openings of each of the first and second rack arms, such that each of the first rack arms and second rack arms are pivotable about the first cross bar; and
a second cross bar extending substantially perpendicularly between each of the pair of first rack arms, wherein the second cross bar is received in the second openings of each of the pair of first rack arms,
wherein each of the pairs of first and second rack arms are configured to engage with and secure to at least one of a tail gate post and a tail gate latch of a vehicle.

7. The bike rack of claim 6, further comprising:
a lock cable fixed to the first cross bar.

8. The bike rack of claim 7, wherein the first cross bar is substantially hollow, forming an interior cavity, and wherein the lock cable is received in the interior cavity in a first position.

9. The bike rack of claim 8, further comprising:
a locking mechanism fixed to at least one of the pair of second rack arms, wherein the locking mechanism is configured to receive a terminal end of the lock cable and securing the lock cable in a locked position.

10. The bike rack of claim 6, further comprising:
a cross bar pad received over an outer surface of the first cross bar.

11. A vehicle-mounted bike rack, comprising:
a pair of first rack arms, each having a post extending from a first end, a first opening formed in a second end of each of the pair of first rack arms,
a pair of second rack arms, each having a slot formed in a first end and an opening formed in a second end of each of the second rack arms;
a first cross bar extending substantially perpendicularly between each of the pair of first and the second rack arms, and wherein the cross bar is received in the first openings of each of the first and second rack arms, such that each of the first rack arms and second rack arms are pivotable about the cross bar; and
wherein each of the pairs of first and second rack arms are configured to engage with and secure to at least one of a tail gate post and a tail gate latch of a vehicle.

12. The bike rack of claim 11, wherein each of the pair of first rack arms includes a second opening formed in the first end of each of the pair of first rack arms.

13. The bike rack of claim 12, further comprising:
a second cross bar extending substantially perpendicularly between each of the pair of first rack arms, wherein the second cross bar is received in the second openings of each of the pair of first rack arms.

14. The bike rack of claim 11, further comprising:
a lock cable fixed to the first cross bar.

15. The bike rack of claim 14, wherein the first cross bar is substantially hollow, forming an interior cavity, and wherein the lock cable is received in the interior cavity in a first position.

16. The bike rack of claim 15, further comprising:
a locking mechanism first fixed to at least one of the pair of second rack arms, wherein the locking mechanism is configured to receive a terminal end of the lock cable and securing the lock cable in a locked position.

17. The bike rack of claim 11, further comprising:
a cross bar pad received over an outer surface of the first cross bar.

* * * * *